United States Patent [19]

Coleman

[11] Patent Number: 4,945,728
[45] Date of Patent: Aug. 7, 1990

[54] CENTER COMPENSATING TANDEM MASTER CYLINDER WITH SEALS IN CYLINDER WALL

[75] Inventor: John R. Coleman, Dayton, Ohio

[73] Assignee: General Motors Corporation, Detroit, Mich.

[21] Appl. No.: 371,187

[22] Filed: Jun. 26, 1989

[51] Int. Cl.$^5$ .............................................. B60T 11/20
[52] U.S. Cl. ........................................ 60/562; 60/588; 92/170.1; 277/152; 277/205
[58] Field of Search ................. 92/169.1, 170; 60/533, 60/562, 588; 277/152, 205

[56] References Cited

U.S. PATENT DOCUMENTS

| | | | |
|---|---|---|---|
| 2,569,025 | 9/1951 | Schultz | 60/588 X |
| 3,232,628 | 2/1966 | Brand | 60/562 X |
| 4,503,677 | 3/1985 | Crumb et al. | 60/562 |
| 4,514,982 | 5/1985 | Bach et al. | 60/562 |
| 4,524,585 | 6/1985 | Coll et al. | 60/562 |
| 4,527,395 | 7/1985 | Gaiser et al. | 60/562 |
| 4,685,301 | 8/1987 | Bacardit et al. | 60/562 |

FOREIGN PATENT DOCUMENTS

| | | | |
|---|---|---|---|
| 159236 | 10/1985 | European Pat. Off. | 60/562 |
| 2645992 | 4/1977 | Fed. Rep. of Germany | 60/588 |

*Primary Examiner*—Edward K. Look
*Assistant Examiner*—George Kapsalas
*Attorney, Agent, or Firm*—Ernest E. Helms; D. D. McGraw

[57] ABSTRACT

A master cylinder having pistons sliding through high pressure lip seals during operation. When the pistons are at rest during release, the seals are in an open position relative to the pistons sufficient to permit the passage of fluid therepast for compensation. The open positions are attained by providing piston portions of smaller diameter than the high pressure seals. These piston portions may be at least parts of piston beveled edge surfaces, or such edge surfaces in conjunction with notches or grooves which are of smaller diameter than the high pressure lip seals. The notches or grooves may extend circumferentially completely around the pistons, or may be arcuately extending circumferentially spaced notches or grooves.

8 Claims, 1 Drawing Sheet

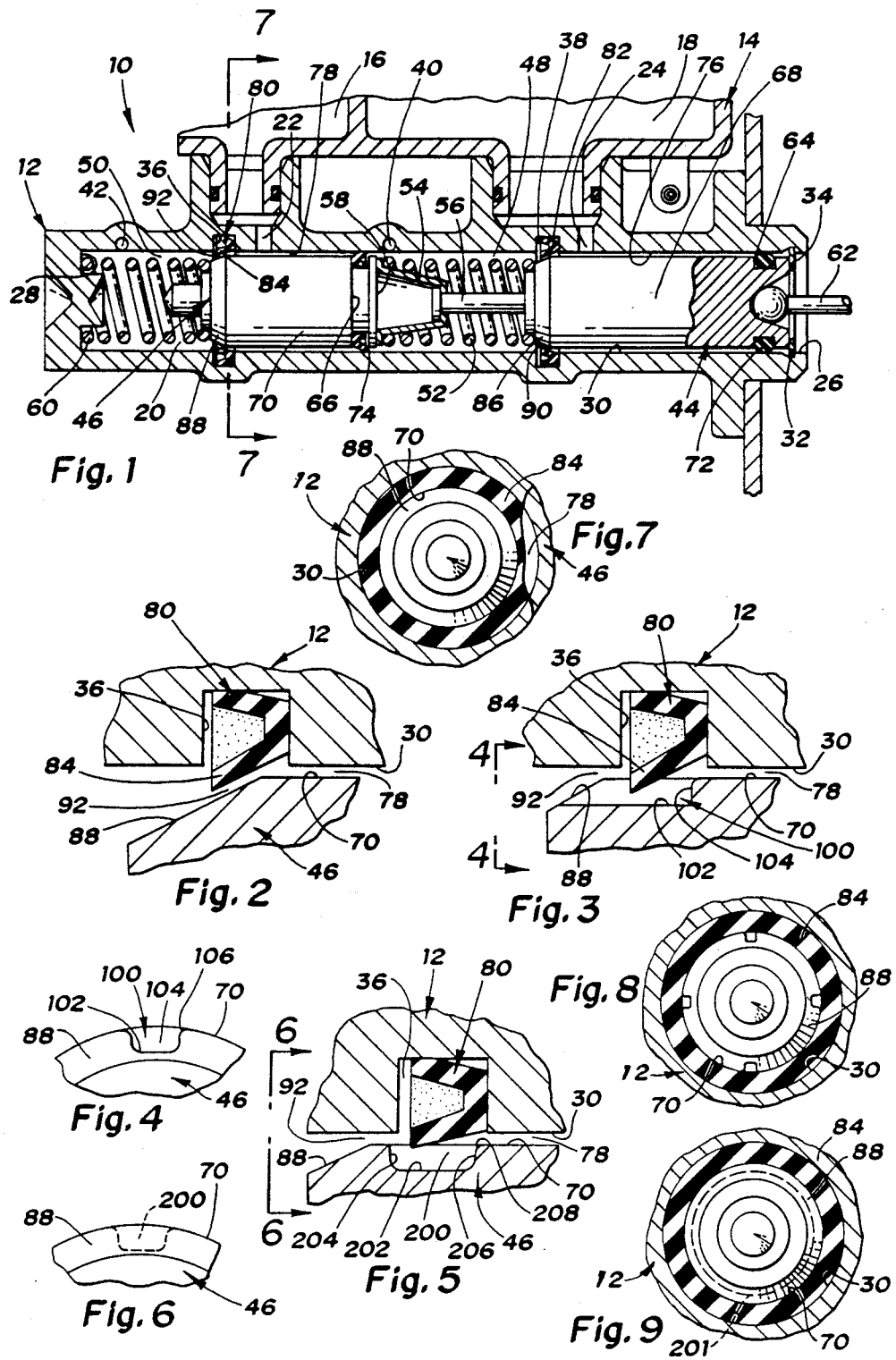

CENTER COMPENSATING TANDEM MASTER CYLINDER WITH SEALS IN CYLINDER WALL

BACKGROUND OF THE INVENTION

Typical master cylinders in use in automotive vehicles for many years were arranged with one piston in a housing bore, the piston being movable to pressurize brake fluid to operate the vehicle brakes. Similar master cylinders have been used for other purposes as well, such as hydraulic clutch operators. Such master cylinders are still used for braking some farm machinery, bicycles, small off-the-road vehicles, and the like. Later developments in the automotive vehicle brake field led to the adoption of the dual or tandem type master cylinder; that is, they have two pressurizing chambers in a common bore having a closed end and an open end, with brake fluid being pressurized by a primary piston and a secondary piston arranged in tandem in the bore. One of the chambers is typically connected to one brake circuit, such as one containing the vehicle front brakes, and the other chamber is typically connected to another brake circuit containing the vehicle rear brakes. At times other circuit arrangements, and even additional pressurizing chambers, are used.

Somewhat like the earlier noted single piston master cylinders, a dual master cylinder usually has a pair of holes in the main body adjacent each of the primary and secondary piston seals. The holes are connected with the master cylinder reservoir and extend to the bore. One of the holes is a compensating port located behind the seal of the associated piston. The other hole is a bypass hole positioned in front of the seal of the associated piston. When the master cylinder is actuated, the seals move across their respective bypass holes so that these holes are no longer fluidly connected with the pressurizing chambers, and the brake fluid in those chambers and the brake circuits connected with them can be pressurized to actuate the brakes. These seals are usually cup-like or V-block seals with lips which are subject to seal extrusion into the bypass holes under some conditions, resulting in damage to the seal and loss of full functioning pressure generation for the brake circuit associated with the damaged seal. In normal service braking operation, there is little pressure in the pressurizing chambers until the bypass holes are closed, so extrusion into those holes is minimized. However, with the advent of systems variously referred to as anti-lock, anti-skid, wheel lock control, or anti-block systems the modulation of brake pressures in the brake circuits when that type system is operating can cause rapid travel of the piston seals, and particularly the secondary piston seal, back and forth across the associated bypass hole. The front bypass hole has been found to contribute to most of the seal damage in a dual master cylinder under such conditions. That seal is the bypass hole associated with the forward pressurizing chamber in the master cylinder bore, which is commonly connected to the vehicle rear wheel brakes.

Some proposals have been made to include compensation valves in the piston or pistons. While such valves have been found to function, they require additional parts and assembly.

SUMMARY OF THE INVENTION

By eliminating the bypass hole or holes over which a piston pressure seal must pass, potential damage to that seal caused by extrusion of the seal into the bypass hole is no longer possible. While this has assumed greater importance with anti-lock systems, it remains an advantage even in the single piston master cylinders. Instead of the bypass hole or holes, or multiple-part valve arrangements in the piston, the invention provides center compensation without adding additional parts. It only requires a relocation of some seals and modified machining operations. With the invention, a master cylinder piston slides through a high pressure seal during actuation. While at rest in the released position, the seal and the piston are in an open position. This allows the fluid and the fluid pressure in the pressurizing chamber and the circuit such as the brake circuit with which that chamber is normally connected to be bypassed back to the reservoir at the last part of the release stroke, and to be compensated so that no undesired residual pressure, or a subatmospheric pressure, is retained in the circuit and the pressurizing chamber. With the fluid path being open between the fluid reservoir and the pressurizing chamber while the master cylinder is released, temperature compensation is readily accomplished. The piston is positioned slightly away from the seal while it is at rest in the released position. In some instances it may use small notches, grooves or one or more segments thereof to allow the flow path to be maintained. This involves modification to the forward end of the piston or pistons, which is a machining operation. It relocates one or more seals from the piston to the housing bore wall. It uses no additional parts when compared to the typical current master cylinders in commercial use.

BRIEF DESCRIPTION OF THE DRAWING

FIG. 1 is a cross section view of a dual master cylinder assembly embodying the invention and having parts broken away.

FIG. 2 is an enlarged fragmentary view of one of the parts of the master cylinder assembly of FIG. 1 indicated by a dashed circle in that FIGURE.

FIG. 3 shows a modification of the invention of FIGS. 1 and 2, and is similar to FIG. 2.

FIG. 4 is a fragmentary elevation view taken in the direction of arrows 4—4 of FIG. 3.

FIG. 5 is similar to FIGS. 2 and 3, and shows another modification of the invention.

FIG. 6 is similar to FIG. 4, is taken in the direction of arrows 6—6 of FIG. 5.

FIG. 7 is an end elevation view of a piston, shown as a part of a cross section view taken in the direction of arrows 7—7 of FIG. 1, with the piston having been modified somewhat like FIG. 3 to provide dimples at circumferentially spaced locations.

FIG. 8 is a view similar to that of FIG. 7 showing geometrically spaced grooves of FIG. 4.

FIG. 9 is a view similar to that of FIG. 7 showing a groove as in FIG. 5 which extends circumferentially.

DESCRIPTION OF THE PREFERRED EMBODIMENTS

The master cylinder assembly 10 is of the dual or tandem type. It has a housing 12 on which is mounted a reservoir 14. Reservoir compartments 16 and 18 are each connected to the bore 20 in the housing 14 respectively through front and rear compensating ports 22 and 24, as is well known in the art. It is to be recognized, however, that there are no bypass holes in the housing which also connect these compartments and the bore 20.

Bore 20 is open at its rear end 26 and closed at its front end 28. The bore is defined by its side wall 30 through which ports 22 and 24 open. An internal groove 32 near the bore rear end contains a piston stop 34 which may be a C-ring. Other internal grooves 36 and 38 are formed in bore wall 30 in axially spaced relation as will be further described. The bore 30 is also provided with ports 40 and 42 which are adapted to be connected to separate brake circuits as is well known. These ports conduct brake fluid and pressure to the brake circuits when the master cylinder is actuated, and return brake fluid to the bore and to the reservoir compartments upon release of the master cylinder to release the brakes in the brake circuits.

Primary and secondary pressurizing pistons 44 and 46 are reciprocably received in bore 30. They cooperate with the bore wall 30 and the bore closed end to define primary and secondary pressurizing chambers 48 and 50 to which ports 40 and 42 are always respectively open. Primary piston 44 is provided with a return spring 52 and a spring seat and retainer 54 mounted movably on pin 56 as is well known in the art. In the released position shown, the rear face 58 of secondary piston 46 is located against the spring seat and retainer 54, being urged to that position by the secondary piston return spring 60. Spring 60 is located in chamber 50 and has its forward end in abutment with the bore closed end 28. Since it has a lower spring rate and preload than spring 52, it does not move retainer 54 rearwardly on pin 56. A push rod 62 is illustrated to transmit brake pressure generating forces to primary piston 44 and secondary piston 46, as is well known. Push rod 62 may be connected to a power brake booster or to other appropriate mechanism operated by the vehicle operator to apply and release the vehicle brakes.

Pistons 44 and 46 respectively have seal grooves 64 and 66 formed in their respective cylindrical outer surfaces 68 and 70. Primary and secondary piston housing seals 72 and 74 are respectively received in grooves 64 and 66 so that they also engage the bore wall 30 in slidable sealing relation. Seal 72 is illustrated as being an O-ring seal, while seal 74 is a V-block seal oriented to seal higher pressures in chamber 48. The diameters of the piston outer surfaces 68 and 70 are less than the diameter of the bore wall 30 so that annular spaces 76 and 78 are provided around the pistons 44 and 46, respectively. Piston seals 80 and 82 are respectively received in bore wall grooves 36 and 38. These seals are also V-block seals. Their inner lips 84 extend into the bore 20 so that the inner diameters of the lips 84 are less than the diameters of piston outer surfaces 68 and 70. Therefore, at any time that a cylindrical piston outer surface is in engagement with a seal lip 84, the open side of the V-block seal is sealed. For example, when lip 84 of V-block seal 82 is in engagement with piston outer surface 68 as piston 44 moves leftwardly as shown in the drawing, chamber 48 is sealed so long as its pressure is as high as or higher than the pressure in annular space 76. Due to the orientation of seal 80, it similarly seals chamber 50 so long as its pressure is as high as or higher than the pressure in annular space 78.

The front face edges of pistons 44 and 46 are beveled to provide beveled edge surfaces 86 and 88, respectively, as best shown in FIGS. 1 and 2. These beveled edge surfaces have their front portions of lesser diameter than the inner diameters of seal lips 84 so that there are open clearance spaces 90 and 92 between the lips 84 and their respective surfaces 86 and 88 with the master cylinder in the released position shown. These open clearance spaces therefore provide bypass ports for pressurizing chambers 48 and 50.

When the pistons 44 and 46 are actuated, they move leftwardly as seen in the drawing, engaging seal lips 84 to close off chambers 48 and 50. Further piston movements pressurize brake fluid in chambers 48 and 50 and pressurized brake fluid is delivered to the brakes through ports 40 and 42. Upon brake release, pistons 44 and 46 are moved rearwardly by the force of their return springs 52 and 60 as well as the hydraulic pressures in their respective brake circuits acting on their forward faces. Once the pistons clear the seal lips 84 to open spaces 90 and 92, any remaining brake pressures in chambers 48 and 50 are bypassed to annular spaces 76 and 78, then through compensating ports 22 and 24 to the reservoir compartments 16 and 18. Thus seal lips 84 of seals 80 and 82, or any parts of the other seals 72 and 74, never pass over a bypass hole in the bore wall 30, and thus are not subjected to extrusion in such holes and subsequent damage to the seals. The arrangement requires no additional parts in comparison to the typical arrangement using housing bypass holes. It does change the cup seals normally mounted on the faces of the pistons to V-block seals mounted in grooves in the bore wall. It also requires the beveled edge surface machining operation. It eliminates the bypass hole drilling operations, the peening of the holes, and the replacement of cup seals because of damage due to extrusion into the bypass holes.

FIG. 2 shows the relationship of seal lip 84 of seal 80 with piston beveled edge surface 88 in greater detail, in the area of the dashed circle in FIG. 1. While it shows the arrangement in the area of the front of secondary piston 46, it just as well illustrates the arrangement in the area of the front of primary piston 44 concerning seal lip 84 of seal 82 and beveled edge surface 86.

FIGS. 3, 4, 5 and 6 show modifications of the piston forward faces and edge surfaces. While they may apply to both pistons 44 and 46, they are illustrated in relation to piston 46 and V-block seal 80. It is to be understood that piston 44 may be similarly constructed if desired.

The modification in FIG. 3 has a notch 100 cut out of the radially outer part of the beveled edge surface 88. If desired, notch 100 may extend around the entire circumference of the piston, or it may be only an arcuate segment as shown in FIG. 4. If the latter, it is preferred that a plurality of such notch annular segments be provided, as illustrated in FIG. 7. Notch 100 is shown as being defined by an axially extending wall 102 of lesser diameter than the inner diameter of seal lip 84, a radially oriented wall 104, and a rounded corner 106 where wall 104 joins piston outer surface 70. Corner 106 is the only corner engageable by seal lip 84 during brake actuation or release, and by rounding it the seal lip is even better protected.

The modification in FIG. 5 has a groove 200 defined by an axially extending bottom wall 202 and radial walls 204 and 206. Groove 200 is located axially adjacent to beveled edge surface 88, which in this instance extends outwardly to the piston outer surface 70 throughout its circumference. With piston 46 in the released position, groove 200 is in radial alignment with seal lip 84 so that there is a clearance space between the lip and the piston. The corner 208 over which seal lip 84 passes as the piston 46 is moved leftwardly is rounded to prevent seal damage. Groove 200 may extend circumferentially about piston 46, or, as shown in FIG. 6, is only an arcuate segment, with a plurality of such arcuate segments being provided in a manner similar to the notches of FIG. 7.

The inventive structures may be used in single piston master cylinders and in master cylinders other than those for automotive vehicle braking. They effectively eliminate seal damage by extrusion into bore wall bypass holes by eliminating those holes, and then providing one or more bypass arrangements within the wall of the cylinder bore. By being within bore 20, these arrangements provide center compensation.

I claim:

1. A master cylinder having a housing, a bore defined by a bore side wall in said housing, primary and secondary pistons reciprocably received in said bore and forming with said housing primary and secondary brake fluid pressurizing chambers adapted to be connected to primary and secondary brake fluid circuits, said primary chamber being between said pistons, primary and secondary piston return springs in said respective chambers urging said pistons to a brake released position, and a brake fluid reservoir having a compensating port in continuous fluid communication with said bore through said bore side wall;

said pistons being smaller in diameter than said bore side wall so as to define axially extending primary and secondary annular spaces respectively therebetween; said secondary piston having a front end and a rear end, a beveled edge surface at said front end defining at least part of a smaller diameter portion of said piston, and an annular seal groove formed adjacent said rear end, said annular piston seal groove having a V-block housing seal therein sealingly and slidably engaging said bore side wall;

said bore side wall having an annular seal groove formed therein adjacent but in axially spaced relation to said compensating port on the side thereof toward said secondary pressurizing chamber, said bore side wall seal groove having therein a V-block secondary piston seal, said V-block secondary piston seal having an annular inner lip of smaller inner diameter than said secondary piston and extending radially into said bore from its groove;

said smaller diameter portion of said secondary piston having a smaller diameter than said secondary piston V-block seal inner lip so as to provide radial clearance therebetween when said seal inner lip and said smaller diameter portion of said secondary piston are in a radially aligned position, said radially aligned position occurring when said secondary piston is in its released position;

said secondary piston when moved in the pressurizing direction in said bore moving said secondary piston smaller diameter portion axially beyond said secondary piston seal inner lip, said seal inner lip engaging said secondary piston in sealing relation with pressure being generated in said secondary pressurizing chamber acting on said secondary piston seal to maintain sealing action between said secondary piston seal inner lip and said secondary piston;

said secondary piston when thereafter moved in the releasing direction moving to radially realign said secondary piston seal inner lip and said secondary piston smaller diameter portion to reestablish the radial clearance therebetween and thereby open brake fluid compensation communication from said secondary pressurizing chamber to said reservoir via said annular space and said compensating port; and said piston secondary piston housing seal is a V-block seal which seals said secondary piston and said bore side wall so long as the pressure in said primary pressurizing chamber is at least as great as the pressure in said secondary annular space, said secondary piston housing V-block seal permitting the passage of fluid from said secondary annular space when the pressure in said primary pressurizing chamber is less than the pressure in said secondary annular space.

2. The master cylinder of claim 1 in which said secondary piston smaller diameter portion is defined by said beveled edge surface.

3. The master cylinder of claim 1 in which said secondary piston smaller diameter portion includes at least a part of said beveled edge surface and further includes notch means formed in the radially outer portion of said beveled edge surface and extending axially rearwardly of said piston, said notch means being radially aligned with said seal inner lip when said piston is in its released position.

4. The master cylinder of claim 3 in which said notch means extends circumferentially about said piston.

5. The master cylinder of claim 3 in which said notch means includes a plurality of circumferentially spaced notches.

6. The master cylinder of claim 1 in which said piston smaller diameter portion includes a part of said beveled edge surface and further includes groove means in said piston positioned immediately adjacent to but axially rearward of said beveled edge surface, said groove means being axially aligned with said seal inner lip when said piston is in its released position.

7. The master cylinder of claim 6 in which said groove means includes a plurality of circumferentially spaced arcuately extending groove segments.

8. A master cylinder having a housing, a bore defined by a cylindrical bore side wall in said housing, a primary pressurizing piston and a secondary pressurizing piston reciprocably received in said bore in axially tandem relation and forming with said housing brake fluid primary and secondary pressurizing chambers adapted to be connected to separate brake fluid circuits, piston return springs in said chambers urging said pistons to the brake released position, and a brake fluid reservoir having rear and front compensating ports in continuous fluid communication with said bore through said bore side wall;

said primary and secondary pistons being smaller in diameter than the diameter of said bore side wall so as to define primary and secondary annular spaces therebetween, said pistons each having a front end, a rear end and an annular seal groove formed adjacent said rear end, each of said piston seal grooves having a seal therein engaging said bore side wall, each of said pistons having a beveled edge surface at said piston front end defining at least a part of a smaller diameter portion of each of said pistons;

said bore side wall having primary and secondary annular seal grooves formed therein respectively adjacent but in axially spaced relation to said rear and front compensating ports on the sides thereof respectively toward said primary and secondary pressurizing chambers, said bore side wall seal grooves respectively having therein primary and secondary V-block seals, said V-block seals each having an annular inner lip of smaller diameter than said pistons and extending radially into said bore from its groove;

said smaller diameter portion of each of said pistons having a smaller diameter than said V-block seal inner lips so as to provide radial clearance therebetween when said seal inner lips and said smaller diameter portions of said pistons are respectively in a radially aligned position occurring when said pistons are in their released position;

said pistons when moved in the pressurizing direction in said bore moving said piston smaller diameter portions axially beyond said seal inner lips, said seal inner lips then engaging said pistons in sealing relation with pressure being generated in said pressurizing chambers acting on said seals to maintain sealing action between said seal inner lips and said pistons;

said pistons when thereafter moved in the releasing direction moving to radially realign said seal inner lips and said piston smaller diameter portions to reestablish the radial clearances therebetween and thereby open brake fluid compensation communication from said pressurizing chambers to said reservoir via said annular spaces and said compensating ports.

* * * * *